United States Patent Office 3,839,344
Patented Oct. 1, 1974

3,839,344
N-METHYL D-GLUCAMINE SALT OF 2(2'-METHYL-3' - TRIFLUOROMETHYLANILINO) NICOTINIC ACID
Margaret H. Sherlock, Bloomfield, N.J., assignor to Schering Corporation, Bloomfield, N.J.
No Drawing. Filed Mar. 28, 1973, Ser. No. 345,608
Int. Cl. C07d 31/36
U.S. Cl. 260—295.5 R          1 Claim

ABSTRACT OF THE DISCLOSURE

This invention relates to the N-methyl-D-glucamine salt of 2-(2'-methyl-3'-trifluoromethylanilino) nicotinic acid and to its particular suitability as a parenterally administered analgesic agent.

---

This invention relates to the N-methyl-D-glucamine salt of 2-(2'-methyl-3'-trifluoromethylanilino)nicotinic acid, to its preparation, and to its use as a potent analgesic, particularly suitable for parenteral administration.

It is well known that certain substituted anilino nicotinic acids, and salts thereof, are useful as analgesic/antiinflammatory agents. Indeed, as described in U.S. Pats. 3,337,570 and 3,689,653 and in Belgian Pat. 679,271, the preparation and properties of such compounds are well-described. Quite unexpectedly, I have discovered that the N-methyl glucamine salt of a particular compound of this group is a potent analgesic particularly suitable for parenteral administration.

According to standard rat yeast paw tests it has been found upon comparison with its free acid or sodium salt, that the N-methyl-D-glucamine salt of 2-(2'-methyl-3'-trifluoromethyl anilino) nicotinic acid was the only compound which produced marked analgesic activity after subcutaneous administration, such that neither the 2-(2'-methyl-3'-trifluoromethylanilino) nicotinic acid per se or its sodium salt produced comparable analgesic activity even at doses four times that of the N-methyl-D-glucamine salt. The foregoing factor being in marked contrast to the showing that the N-methyl-D-glucamine salt of either 2-(2'-methyl-3'-chloroanilino) nicotinic acid or 2-(3'-trifluoromethylanilino) nicotinic acid did not exhibit any such activity. Also in contrast, the N-methyl-D-glucamine salt of 2-(2'-methyl-3'-trifluoromethylanilino) nicotinic acid and of 2-(2'-methyl-3'-chloroanilino) nicotinic acid are virtually equipotent when compared to their respective free acid after *oral* administration. Thus, the N-methyl-D-glucamine salt of 2-(2'-methyl-3'-trifluoromethylanilino) nicotinic acid has unique parenteral activity with a potency comparable to that seen by potent narcotic analgesics such as morphine and the like. Indeed, when compared either on its analgesic potency or on its relative freedom from undesirable side effects, the N-methyl-D-glucamine salt of 2-(2'-methyl-3'-trifluoromethylanilino) nicotinic acid is more advantageously applied than such drugs as morphine, meperidine hydrochloride, and pentazocine; it being well known that such compounds possess very valuable and useful analgesic properties. Thus, the N-methyl-D-glucamine salt of 2-(2'-methyl-3'-trifluoromethyl) nicotinic acid is particularly suitable as a parenterally administered analgesic in clinical and veterinary applications for those conditions wherein such prior art compounds would normally be indicated. In such instances the dose, as determined by standard assay techniques, would be 0.25 to 10 milligrams per kilogram of body weight parenterally (i.e., intravenously, subcutaneously or intramuscularly) administered. In addition to its parenteral analgesic properties, the compound of this application also possesses antiinflammatory properties.

The preparation of the compounds of this invention are as follows:

CHEMICAL PREPARATIONS

A. 2(2'-Methyl-3'-trifluoromethylanilino) nicotinic acid

To 20 g. of 2-methyl-3-trifluoromethyl aniline heated at 200°, add, in a dropwise fashion, 11 g. of ethyl 2-chloronicotinate. Heat the reaction mixture of 200 for one-half hour, cool, pour the mixture onto ice and extract with ether. Concentrate the ester extracts, dry and fractionate the residue *in vacuo*; b.p. 143–146°/0.15 mm.; m.p. 44–46°.

To a solution of 12 g. of ethyl (2-2'-methyl-3'-trifluoromethylanilino)nicotinate in 100 ml. of methanol and 4.6 g. of potassium hydroxide in 10 ml. of water. Reflux the solution for three hours, concentrate *in vacuo* and dissolve the residue in water. Acidify the aqueous solution to yield the desired 2(2'-methyl-3'-trifluoromethylanilino) nicotinic acid, m.p. 226–228° C. after recrystallization from acetone-hexane.

B. N-Methyl-D-glucamine salt

A mixture of 15 g. of 2(2'-methyl-3'-trifluoromethylanilino) nicotinic acid and 10.5 g. of N-methyl glucamine was dissolved in 70 ml. of hot ethanol. On dilution with 300 ml. of ether, the salt separated as colorless crystals, m.p. 135–137°. (Can be recrystallized from acetonitrile or ethanol-ether, m.p. 136–139.)

PHARMACEUTICAL FORMULATION PREPARATIONS

A. Intramuscular/Subcutaneous Formula

|  | Mg./ml. |
|---|---|
| N-methyl-D-glucamine salt of 2(2' - methyl-3'-trifluoromethylanilino) nicotinic acid | [1] 10–150 |
| Disodium Edetate, USP | 0.1 |
| Formopon | 2.5 |
| Phenol, Crystalline Mallinckrodt, AR | 5.0 |
| Diethanolamine | 4.0 |
| Propylene Glycol, U.S.P. | 100.0 |
| HCl 2.0 Normal q.s. to pH 8.5. | |
| Water for Injection q.s. to 1.0 ml. | |

[1] Base equivalent.

Procedure

Charge about 80–85% of the Water for Injection into a suitable compounding vessel and sparge with nitrogen for 10 minutes. Add and dissolve separately with agitation, in order, the following ingredients while sparging: propylene glycol, diethylanolamine, phenol, disodium edetate, and formopon. Discontinue sparging and add sufficient 2.0 N hydrochloric acid solution to adjust the pH to 8.5. Dissolve with agitation N-methyl-D-glucamine salt of 2(2'-methyl-3'-trifluoromethylanilino) nicotinic acid and bring the solution to volume. Aseptically filter the solution through a suitable sterilizing membrane equipped with a prefilter. Fill the required amount into appropriate sterile containers.

B. Intravenous Formula

|  | Mg./ml. |
|---|---|
| N-methyl-D-glucamine salt of 2(2'-methyl-3-trifluoromethylanilino) nicotinic acid | [1] 10–150 |
| Disodium Edetate, USP | 0.1 |
| Sodium Bisulfite, USP | 1.625 |
| Benzyl Alcohol, NF | 15.0 |
| Sodium Hydroxide 1.0 Normal q.s. to pH 8.5. | |
| Water for Injection, USP q.s. to 1.0 ml. | |

[1] Base equivalent.

Procedure

Charge about 80–85% of the Water of Injection into a suitable compounding vessel and sparge with nitrogen for 10 minutes. Add and dissolve separately with agitation while sparging, in order, the following ingredients: benzyl alcohol, disodium edetate, and sodium bisulfite. Discontinue nitrogen sparging and adjust the pH to 8.5 with 1.0 Normal sodium hydroxide solution. Dissolve with agitation the N-methyl-D-glucamine salt of 2(2'-methyl-3'-trifluoromethylanilino) nicotinic acid and bring the solution to final volume. Aseptically filter the solution through a suitable sterilizing membrane equipped with prefilter. Fill the required amount into appropriate sterile containers.

I claim:
1. The N-methyl-D-glucamine salt of 2(2'-methyl-3'-trifluoromethylanilino) nicotinic acid.

References Cited
FOREIGN PATENTS 210   7/1968   France _____ 260—295.6 R

OTHER REFERENCES

Evans et al., Journal of Medicinal Chemistry, vol. 10 (3) pp. 428–31 (1967).

ALAN L. ROTMAN, Primary Examiner

U.S. Cl. X.R.

424—266